United States Patent [19]

Greivenkamp, Jr. et al.

[11] Patent Number: 4,460,259
[45] Date of Patent: Jul. 17, 1984

[54] SINGLE LENS RANGEFINDER DEVICE HAVING LIGHT EMITTER AND DETECTOR

[75] Inventors: John E. Greivenkamp, Jr., Rochester; David N. Lambeth, Webster; James W. Meyer, Fairport, all of N.Y.

[73] Assignee: Eastman Kodak Company, Rochester, N.Y.

[21] Appl. No.: 449,330

[22] Filed: Dec. 13, 1982

[51] Int. Cl.$^3$ ............................................. G03B 3/10
[52] U.S. Cl. ............................................. 354/403
[58] Field of Search ......................................... 354/403

[56] References Cited

U.S. PATENT DOCUMENTS

| Re. 27,461 | 8/1972 | Harvey | 95/44 C |
|---|---|---|---|
| 3,631,785 | 1/1971 | Perlman et al. | 95/44 |
| 3,635,135 | 1/1972 | Ambraschka | 95/10 A |
| 3,736,057 | 5/1973 | Harvey | 356/4 |
| 3,836,919 | 9/1974 | Matsumoto et al. | 354/403 |
| 4,025,785 | 5/1977 | Mueller | 354/403 X |
| 4,065,778 | 12/1977 | Harvey | 354/25 |
| 4,148,574 | 4/1979 | Johnson | 354/195 |
| 4,174,159 | 11/1979 | Kraft et al. | 354/23 R |
| 4,313,654 | 2/1982 | Matsui et al. | 354/403 |

FOREIGN PATENT DOCUMENTS 1590248  5/1981  United Kingdom .

*Primary Examiner*—Michael L. Gellner
*Attorney, Agent, or Firm*—Thomas H. Close

[57] ABSTRACT

A simple rangefinder device, suitable for two-zone ranging applications, comprises a single lens, a light emitter located with respect to the lens to produce a beam of light, and a light detector located with respect to the lens to define a field of view. The effective lens aperture for the emitter and the detector substantially coincide and the field of view of the detector overlaps the light beam in a detection region extending away from the lens for a predetermined distance. Signal processing electronics receive a signal produced by the light detector to produce a signal representing the presence or absence of a reflecting object in the detection region.

4 Claims, 6 Drawing Figures

SINGLE LENS RANGEFINDER DEVICE HAVING LIGHT EMITTER AND DETECTOR

BACKGROUND OF THE INVENTION

Cross-Reference to Related Applications

Reference is made to copending U.S. patent application Ser. No. 394,002 filed June 30, 1982 by D. C. Abbas.

Field of the Invention

The present invention relates to rangefinder devices suitable for use in photographic cameras or the like, and more particularly to such devices wherein light is directed onto a subject to illuminate the subject, and light reflected from the subject is detected to determine the range to the subject.

Description Related to the Problem

Many popularly priced photographic cameras include an operator selectable closeup lens comprising a diopter lens element that can be moved by the camera operator into the optical path of the taking lens of the camera to shift the focus of the camera to a closeup position. It is desirable to automate this feature so that the switchover to closeup focus is effected automatically when a photographic subject is in the range for closeup photography, e.g. approximately 3 feet or less. For this application, a simple, inexpensive rangefinder capable of distinguishing at least two zones, a near zone and a far zone, is desirable.

Many prior art automatic rangefinders are known, most are more sophisticated than required by the above contemplated application, and hence are prohibitively costly. A relatively simple prior art rangefinder device is shown in U.S. Pat. No. 3,617,128 issued Nov. 2, 1971 to D. M. Harvey. In the rangefinder device disclosed by Harvey, the object distance is determined by detecting the size of a blur circle created by a beam of light. A plurality of discrete detectors sense blur circle size digitally. Another relatively simple prior art rangefinder device, employing two lenses integrally formed from synthetic resins is shown in U.S. Pat. No. 4,313,654 issued Feb. 2, 1982 to Matsui et al. In the device disclosed by Matsui et al, the light emitter and detectors are rigidly mounted on a common substrate behind the integrally formed lenses.

Although relatively simple in form and function, the capabilities of the device disclosed by Harvey and Matsui et al. are still relatively sophisticated for the application contemplated by the present inventors. The construction of the devices are also complicated by the need for separate optical systems for the projecting and receiving optics in the devices.

The problem faced by the present inventors therefore, was to provide a rangefinding device of much simpler construction than those of the prior art, that would be useful in a camera of the type having an automatically controlled closeup lens element.

SOLUTION TO THE PROBLEM—SUMMARY OF THE INVENTION

The above noted problem is solved, according to our invention, by providing a rangefinder comprising a single lens, a light emitter, and a light detector. The light emitter is located with respect to the lens to define a beam of light when the emitter is activated. The light detector is located with respect to the lens to define a field of view and produces a signal representing the amount of light originating in the field of view. The effective lens aperture for the emitter and the detector substantially coincide and the field of view of the detector and the beam defined by the light emitter overlap in a detection region extending a predetermined distance from the lens. When the light emitter is activated, the detector detects light reflected from any object in the detection region. The output from the light emitter is processed by signal processing electronics to produce a signal relating to the presence or absence of an object in the detection region.

In the preferred embodiment of the invention, the emitter and detector are integrated on a common substrate. The emitter emits in the infrared region of the spectrum, and the lens is coated with an antireflectant coating having a transmission window in the region of emission of the light emitter. An infrared transmissive filter is located over the detector to improve the signal-to-noise ratio of the device. The emitter and detector are optically isolated by forming a groove between them on the integrated circuit and filling the groove with opaque material.

BRIEF DESCRIPTION OF THE DRAWINGS

The invention will be described with reference to the accompanying drawings, wherein.

DESCRIPTION OF THE PREFERRED EMBODIMENTS

Figure 1:
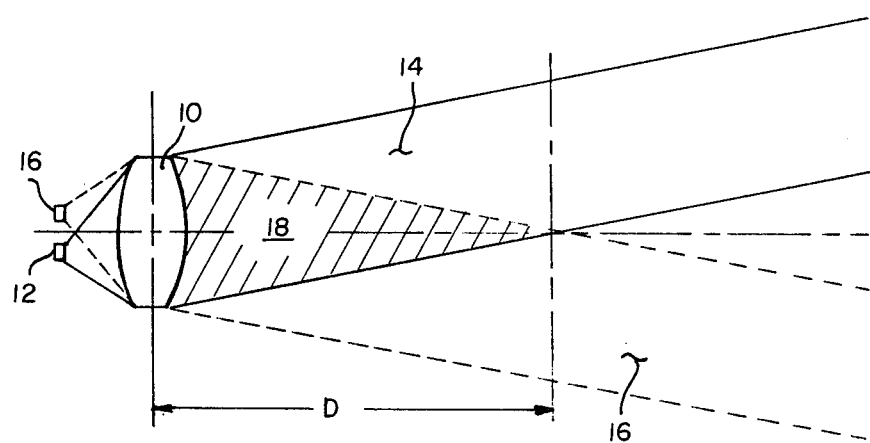
FIG. 1, is a schematic ray diagram useful in describing the principle of operation of a single lens rangefinder device according to the present invention.

Referring to FIG. 1, a single lens rangefinder device according to the present invention includes a single lens 10. A light emitter, such as an LED 12 or a diode laser is located with respect to lens 10 near its focal point to form a beam 14. A photodetector, such as a photodiode 16, is located near the light emitter with respect to lens 10 to cover a field of view 16. The effective lens aperture for the detector and the emitter substantially coincide, so that both the detector and the emitter make full use of the light gathering power of the single lens. Light beam 14 and field of view 16 overlap in a detection region 18, extending a predetermined distance D from lens 10. When LED 12 is activated, any object in beam region 14 will be illuminated. If the object lies in detection region 18, the LED illumination reflected by the object, will be viewed by photodetector 16, thereby causing an increase in the output signal of the photodetector. The output of photodetector 16 is sensed in a detection circuit, described below, to determine whether an object is located in detection region 18.

Figure 2:
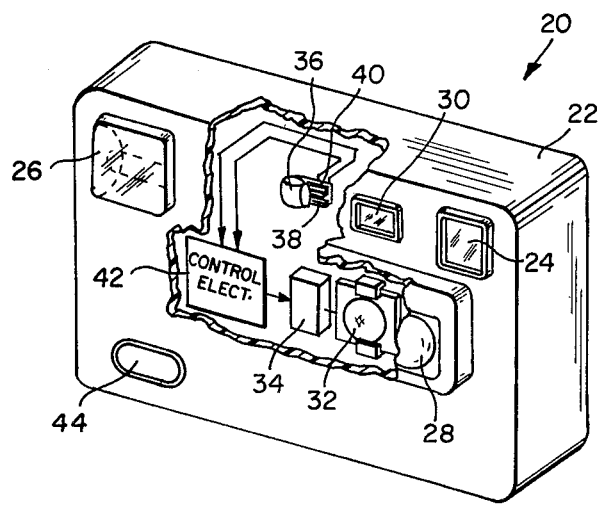
FIG. 2, is a perspective schematic representation of a photographic camera having a single lens rangefinder device according to the present invention, partially broken away to reveal interior detail of the camera.

FIG. 2, shows a rangefinder according to the present invention employed in a still camera 20 of the type for example, adapted to expose disc film. The camera includes a housing 22 defining apertures for a viewfinder 24, an electronic flash 26, taking lens 28, and an exposure control photosensor 30. The body of the camera is partially broken away to reveal that the taking lens 28 is provided with an auxiliary closeup lens 32, movably mounted for sliding into the optical path of the taking lens 28 to change the focus of the taking lens from normal photography to closeup photography (e.g. three feet or closer). An electromagnetic actuator 34, such as a solenoid, or more preferably a planar actuator of the type shown in U.S. Pat. No. 4,024,552 issued May 17, 1977 to Kondo, is connected to the closeup lens, for moving the closeup lens into and out of the optical path of the taking lens.

A rangefinder device according to the present invention controls the position of closeup lens 32. The rangefinder device includes a lens 36, a light emitting diode 38, and a photodiode 40. The light emitting diode 38 and photodiode 40 are electrically connected to a control electronics circuit 42 which drives electromagnetic actuator 34. The camera is provided with a shutter release button 44.

Figure 3:
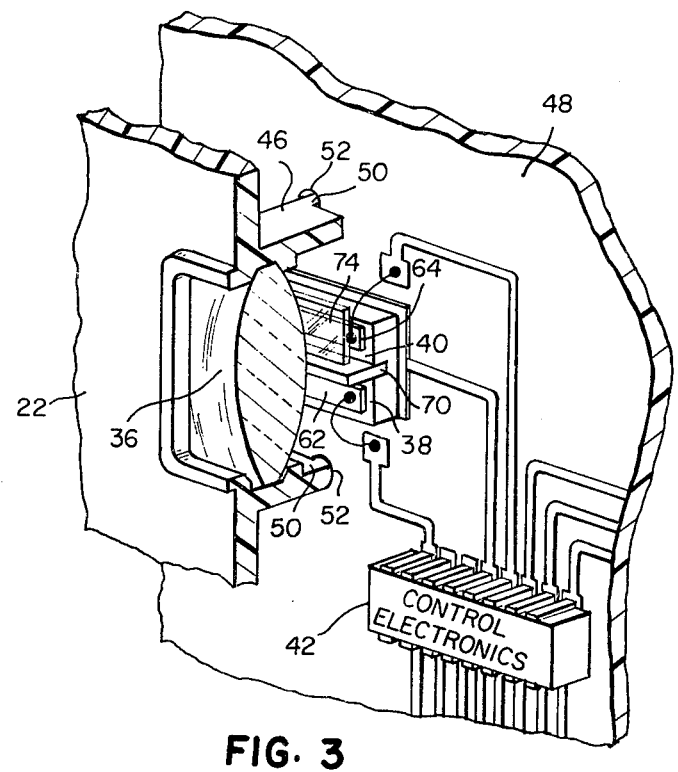
FIG. 3, is an enlarged portion showing details of the rangefinder device of the camera shown in FIG. 2.

Details of the preferred embodiment of the rangefinder device are shown in FIG. 3. An extension 46 of the camera housing 22 forms the sides of an enclosure in which the emitter 38 and detector 40 are housed. Lens 36 covers the front of the enclosure. The back of the enclosure is formed by a printed circuit board 48 which carries the emitter 38 and the detector 40 and the control electronics 42. The printed circuit board may comprise for example, a mild steel mechanism plate coated with a layer of electrically insulating material as described in U.S. patent application Ser. No. 360,491 filed Mar. 22, 1982 by J. K. Lee. Printed circuit board 48 is attached to the back of the housing 46 for example by integral studs 50 extending through holes 52 in the circuit board.

Figure 4:
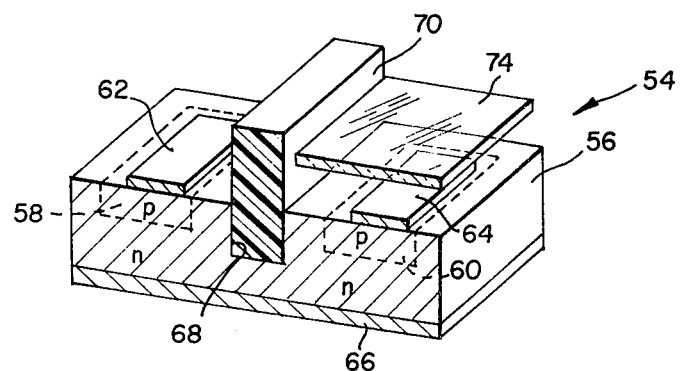
FIG. 4, is a perspective schematic view of a presently preferred light emitter and detector for use with the present invention, integrated on a common substrate.

In the preferred embodiment of the invention, the emitter 38 and detector 40 are integrated on a common substrate. FIG. 4 shows a presently preferred embodiment of an integrated emitter/detector chip 54. The emitter/detector chip 54 is formed on a substrate 56 of n-type gallium arsenide in a conventional manner. The emitter and detector diodes are formed by p-typed doped regions 58 and 60 respectively. Individual addressing electrodes 62 and 64 are formed on the top side of the emitter and detector diodes to make ohmic contact with the respective p-type regions thereunder. A common ground electrode 66 is formed on the backside of the chip. A slot 68 is formed, for example with a diamond saw partway through the chip, for optically isolating the emitter and the detector. A sheet 70 of light absorbing material, such as carbon loaded polymeric film, is fixed in the slot.

Figure 5:
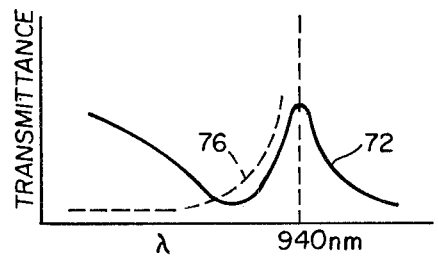
FIG. 5, is a graph illustrating the spectral transmittances of an antireflection coating on the lens and an infrared filter employed with the preferred embodiment of the present invention.

Preferably, lens 36 (see FIG. 3) is coated with an antireflection coating tailored for the wavelength of light emitted by the LED 38. The solid line 72 in FIG. 5, schematically illustrates the transmittance of such an antireflection coating optimized for an LED emitting in the infrared region of the spectrum at about 940 nm. An infrared transmissive filter 74 is placed over the photodiode detector 40 to tailor the response of the detector to wavelengths of light emitted by the LED 38, thereby increasing the signal-to-noise ratio of the rangefinding device. A suitable filter for this purpose is the Wratten 87 C Filter manufactured by the Eastman Kodak Company. The spectral transmission of the infrared transmissive filter is illustrated by the dashed line 76 in FIG. 5.

Figure 6:
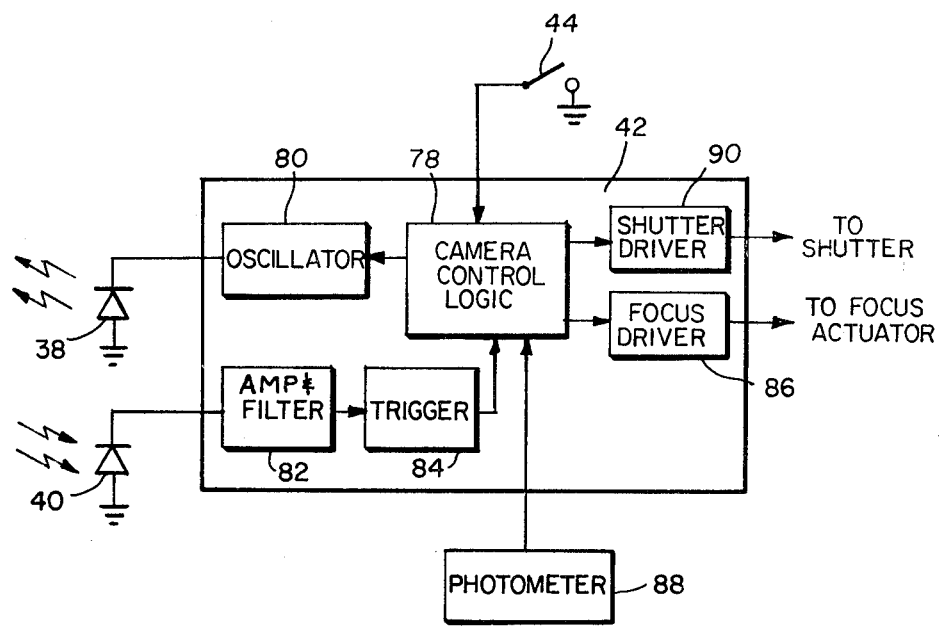
FIG. 6, is an electrical schematic diagram of the rangefinder control electronics shown in FIG. 2.

Control electronics 42 will now be described with reference to FIG. 6. Control electronics 42 include a camera control logic circuit 78, comprising for example a programmed microcomputer, as is well known in the prior camera control art. The camera control logic 78 receives an input from camera actuator switch 44 to begin operation. The computer turns on an oscillator 80 that applies an AC voltage to light emitting diode 38, causing diode 38 to emit a beam of light having an identifiable AC brightness component. The frequency of oscillator 80 is chosen to be compatible with the frequency response of the LED and to be distinguishable from the flicker frequencies associated with artificial illumination.

The signal generated by photodiode 40 is amplified and filtered in a band-pass filter 82 having a pass band centered about the oscillator frequency. The output of the band-pass filter 82 is applied to a trigger circuit 84, which provides a logic level output signal when the output of band-pass filter 82 exceeds a predetermined threshold. The threshold of trigger circuit 84 is set to substantially eliminate the possibility of triggering on noise such as cross-talk between the emitter and detector, caused for example by light reflected within the enclosure. The sides and back of the enclosure are painted black to further reduce this potential noise source. Camera control logic 78 receives the logic signal from trigger circuit 84 and controls a focus/driver circuit 86 in response to the signal. The focus/driver circuit 86 applies power to the electromagnetic actuator 34 (see FIG. 2) to move closeup lens 32 in or out of the optical path of the taking lens 28.

The camera control logic may also control camera exposure, receiving signals from a photometer 88 in controlling a shutter driver 90 in a known manner.

According to a preferred embodiment of the invention, the lens 36 is a 20 mm focal length F2.0 convex lens. The width of notch 68 in the emitter detector chip 54, is approximately 150 microns wide, thereby spacing the LED and photodiode approximately 150 microns apart. The emitter and detector are located substantially in the focal plane of lens 36 and arranged substantially symmetrically about the optical axis of lens 36. As a result of this arrangement, the detection region 18 (see FIG. 1) extends aproximately 1.3 meters from the lens.

The invention has been described with reference to particular embodiments, however, it will be obvious that various modifications and alterations may be made within the spirit and scope of the accompanying claims.

We claim:
1. A rangefinder device, comprising:
 (a) a single lens;
 (b) an LED located with respect to said single lens for forming a beam of light said lens defining an effective aperture for said LED;
 (c) a photodiode located with respect to said single lens to define a field of view overlapping with said beam of light in a detection region extending a predetermined distance from said lens, for detecting light reflected from an object located in said detection region to produce an electrical signal representative of said detected light, said lens defining an effective aperture for said photodiode, substantially coinciding with said effective aperture for said LED, and said LED and said photodiode being integrated on a common substrate; and (d) signal processing means responsive to said electrical signal for producing a signal representing the presence or absence of a reflecting object in said detection region.

2. The invention claimed in claim 1, in combination with a photographic camera having a taking lens, a closeup lens element mounted for movement relative to the optical path of said taking lens, and an actuator responsive to a control signal for moving said closeup lens element in response to the signal from said signal processing means.

3. An improved rangefinder device of the type having a light emitter, including a lens, for forming a beam of light to illuminate a spot on an object and a light sensor, including a lens, for sensing light reflected from the object to determine the distance to the object, wherein the improvement comprises, said light emitter lens and said light sensor lens being one and the same and the effective aperture defined by said lens for said emitter and detector being substantially coincident and wherein said light emitter and light sensor comprise solid state devices integrated on a common substrate.

4. A rangefinder device, comprising:
(a) a single lens;
(b) an LED located near one focal point of the lens for illuminating a first generally cylindrical volume of space;
(c) a solid state light sensitive element located adjacent said LED for viewing a second generally cylindrical volume of space through said single lens and producing an output signal in response to light therefrom, the effective aperture defined by said lens for said LED and said light sensitive element being substantially coincident, said first and second volumes overlapping to define a third volume of space extending a predetermined distance from said lens, said LED and light sensitive element being integrated on a common substrate; and
(d) control circuit means responsive to said output signal for detecting if a reflective object is located in said third volume of space.

* * * * *